United States Patent [19]
Zozawa

[11] Patent Number: 5,434,710
[45] Date of Patent: Jul. 18, 1995

[54] ZOOM LENS SYSTEM COMPRISING THREE LENS UNITS

[75] Inventor: Toshihide Zozawa, Tokyo, Japan

[73] Assignee: Olympus Optical Co., Ltd., Tokyo, Japan

[21] Appl. No.: 995,162

[22] Filed: Dec. 22, 1992

[30] Foreign Application Priority Data

Dec. 24, 1991 [JP] Japan .................. 3-355689

[51] Int. Cl.$^6$ .................. G02B 15/14; G02B 13/18
[52] U.S. Cl. .................. 359/689; 359/685; 359/708
[58] Field of Search .................. 359/689, 685, 686, 687

[56] References Cited

U.S. PATENT DOCUMENTS

| | | | |
|---|---|---|---|
| 4,726,666 | 2/1988 | Ota et al. | 359/681 |
| 4,730,907 | 3/1988 | Kikuchi et al. | 359/689 |
| 4,733,952 | 3/1988 | Fujioka | 359/689 |
| 4,735,493 | 4/1988 | Tachihara | 359/681 |

FOREIGN PATENT DOCUMENTS

| | | |
|---|---|---|
| 51-83543 | 7/1976 | Japan . |
| 53-91756 | 8/1978 | Japan . |
| 53-140047 | 12/1978 | Japan . |
| 54-72066 | 6/1979 | Japan . |
| 55-117118 | 9/1980 | Japan . |
| 56-43619 | 4/1981 | Japan . |
| 56-132306 | 10/1981 | Japan . |
| 57-5023 | 1/1982 | Japan . |
| 58-121011 | 7/1983 | Japan . |
| 58-132209 | 8/1983 | Japan . |
| 59-33417 | 2/1984 | Japan . |
| 59-142515 | 8/1984 | Japan . |
| 60-55311 | 3/1985 | Japan . |
| 61-80214 | 4/1986 | Japan . |
| 61-87117 | 5/1986 | Japan . |
| 61-170716 | 8/1986 | Japan . |
| 60-181717 | 9/1986 | Japan . |
| 63-201616 | 8/1988 | Japan . |

*Primary Examiner*—Scott J. Sugarman
*Attorney, Agent, or Firm*—Cushman Darby & Cushman

[57] ABSTRACT

A zoom lens system comprising, in order from the object side, a first lens unit having a negative refractive power, a second lens unit having a positive refractive power and a third lens unit having a positive refractive power, and configured so as to vary a focal length thereof from a wide position to a tele position by moving the first lens unit non-linearly for maintaining an image surface at a constant location, and moving the second lens unit and the third lens unit from the image side toward the object side so that an airspace reserved between these two lens units is narrowed. The first lens unit consists, in order from the object side, of a negative meniscus lens element having a convex surface on the object side, a negative lens element and a positive meniscus lens element having a convex surface on the object side, the second lens unit consists, in order from the object side, of two positive lens elements and a biconcave lens element, and the third lens unit consists, in order from the object side, of a positive lens element and a negative lens element. The zoom lens system comprises a small number of lens elements including particular three lens elements which compose the first lens unit, and has a high vari-focal ratio and favorable optical performance.

6 Claims, 10 Drawing Sheets

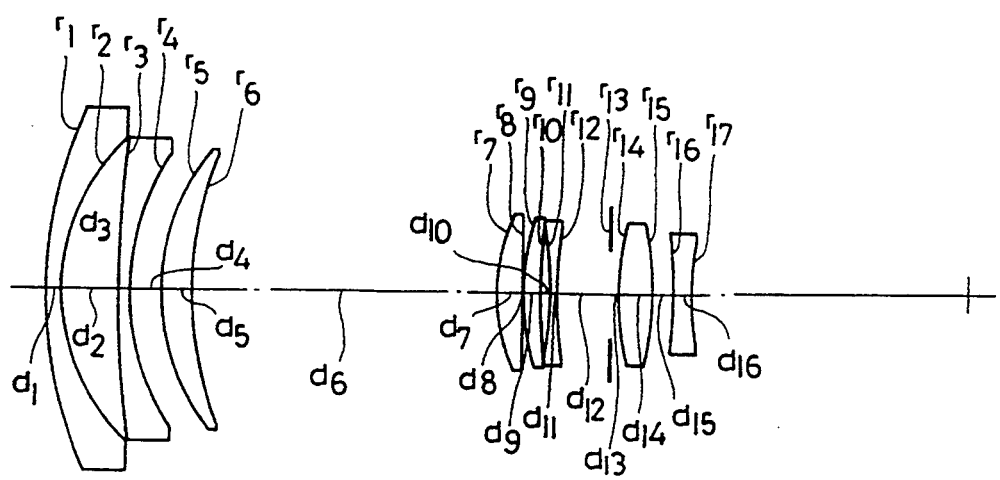
FIG. IA
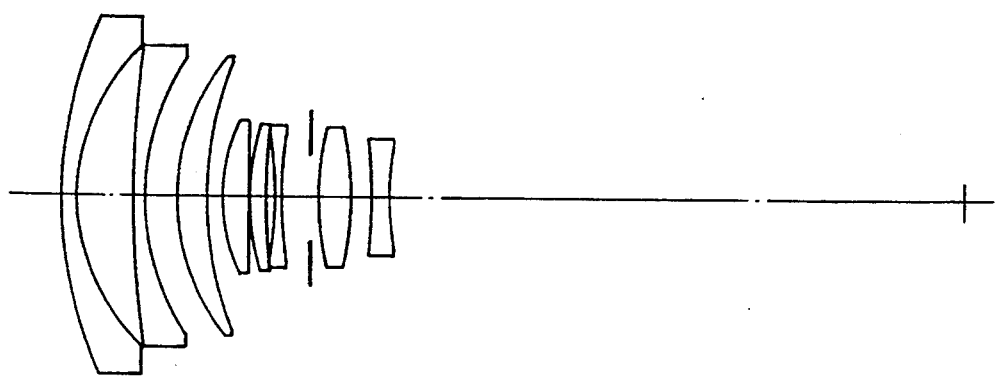
FIG. IB

SPHERICAL
ABERRATION

ASTIGMATISM

DISTORTION

LATERAL
CHROMATIC
ABERRATION

SPHERICAL
ABERRATION

ASTIGMATISM

DISTORTION

LATERAL
CHROMATIC
ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL
ABERRATION

ASTIGMATISM

DISTORTION

LATERAL
CHROMATIC
ABERRATION

SPHERICAL
ABERRATION

ASTIGMATISM

DISTORTION

LATERAL
CHROMATIC
ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

ZOOM LENS SYSTEM COMPRISING THREE LENS UNITS

BACKGROUND OF THE INVENTION a) Field of the Invention

The present invention relates to a zoom lens system which is to be used in still cameras, video cameras and particularly in single-lens reflex cameras, and has a long back focal length, a zooming range covering a standard field angle and a vari-focal ratio of approximately 3.

b) Description of the Prior Art

A zoom lens system which has a zooming range covering the standard field angle and is used in a single-lens reflex camera mostly consists, in order from the object side, of a first lens unit having a negative refractive power and a second lens unit having a positive refractive power, and is configured so as to perform variation of focal length by varying an airspace reserved between these lens units.

As the conventional examples of the zoom lens system consisting of the two lens units as described above, there are known the zoom lens systems disclosed by Japanese patents Kokai Publication No. Sho 51-83,543, Kokai Publication No. Sho 53-91,756, Kokai Publication No. Sho 55-117,118, Kokai Publication No. Sho 56-43,619, Kokai Publication No. Sho 56-132,306, Kokai Publication No. Sho 59-33,417, Kokai Publication No. Sho 59-142,515, Kokai Publication No. Sho 61-80,214 and Kokai Publication No. Sho 63-201,616. Each of these conventional zoom lens systems consists of lens elements in a number as small as seven, but has a vari-focal ratio on the order of 2.

Further, as the conventional zoom lens systems each consisting of lens elements in a larger number and having an enhanced vari-focal ratio, there are known the zoom lens systems disclosed by Japanese patents Kokai Publication No. Sho 53-140,047, Kokai Publication No. Sho 54-72,066, Kokai Publication No. Sho 58-121,011, Kokai Publication No. Sho 60-55,311 and Kokai Publication No. Sho 61-87,117. However, each of these conventional zoom lens systems requires a high manufacturing cost, has a large size and is heavy due to the fact that the zoom lens system adopts a first lens unit which has a large effective diameter and comprises a large number of lens elements, and uses many lens elements which have large outside diameters.

Furthermore, as exemplified by the zoom lens systems disclosed by Japanese patents Kokai Publication No. Sho 57-5,023, Kokai Publication No. Sho 58-132,209, Kokai Publication No. Sho 60-181,717 and Kokai Publication No. Sho 61-170,716, there are known zoom lens systems each of which is configured so as to consist of three lens units by adding a lens unit to the zoom lens system consisting of the two lens units. However, the zoom lens system which consists of the three lens units as described above comprises a large number of lens elements, requires a high manufacturing cost and has a long total length.

SUMMARY OF THE INVENTION

A primary object of the present invention is to provide a zoom lens system which comprises a first lens unit, a second lens unit and a third lens unit; has a high vari-focal ratio on the order of 3 through the first lens unit consists of lens element in a number as small as three; and is capable of favorably correcting aberrations even when the zoom lens system has a large field angle at a wide position thereof.

The zoom lens system according to the present invention comprises, in order from the object side, a first lens unit having a negative refractive power, a second lens unit having a positive refractive power and a third lens unit having a positive refractive power, and is configured so as to perform variation of focal length from the wide position to a tele position by moving the first lens unit non-linearly for maintaining an image surface at a constant location, and moving the second lens unit and the third lens unit from the image side toward the object side so as to narrow an airspace reserved between these lens units. The first lens unit consists, in order from the object side, of a negative meniscus lens element having a convex surface on the object side, a negative lens element and a positive meniscus lens element having a convex surface on the object side, the second lens unit consists, in order from the object side, of two or more positive lens elements and a biconcave lens element, and the third lens unit consists, in order from the object side, of a positive lens element and a negative lens element.

In a zoom lens system, a first lens unit has an effective diameter which is larger than that of the other lens unit or any other lens units disposed in the zoom lens system. For this reason, it is desirable that the first lens unit consists of lens elements in a number as small as possible.

The zoom lens system according to the present invention comprises, in order from the object side, the first lens unit having the negative refractive power, the second lens unit having the positive refractive power and the third lens unit having the positive refractive power as described above. Since the first lens unit generally produces negative distortion, the zoom lens system which consists of the two lens units cannot correct the distortion when the zoom lens system is configured so as to have a large field angle at the wide position and a high vari-focal ratio.

By composing the zoom lens system according to the present invention of the three lens units, the zoom lens system is configured so as to have a large field angle at the wide position and a high vari-focal ratio.

The negative distortion which is produced by the first lens unit is corrected by disposing an aperture stop between the second lens unit and the thrid lens unit, and producing positive distortion with the positive lens elements disposed in the second lens unit and the negative lens element disposed in the third lens unit. For this purpose, the positive lens elements are disposed on the object side in the second lens unit and the negative lens element is disposed on the image side in the third lens unit. Further, the airspace reserved between the second lens unit and the third lens unit is widened at the wide position so that the positive distortion is produced in an increased amount by the second lens unit and the third lens unit, whereby distortion is corrected with good balance in the zoom lens system as a whole.

Furthermore, both the negative lens element disposed in the second lens unit and the negative lens element disposed in the third lens unit produce positive astigmatism. This positive astigmatism can be corrected at the wide position since remarkable astigmatism is produced by the positive lens element disposed in the first lens unit and the positive lens elements disposed in the second lens unit, but positive astigmatism is apt to be produced at the tele position. For this reason, the airspace reserved between the second lens unit and the third lens unit is narrowed at the tele position so that the negative lens elements disposed in the second lens unit and the third lens unit produce astigmatism in a smaller amount, whereby astigmatism is corrected favorably in the zoom lens system as a whole at the tele position.

In the zoom lens system according to the present invention which comprises the first negative lens unit, the second positive lens unit and the third positive lens unit as described above, distortion and astigmatism are corrected favorably. In the zoom lens system according to the present invention, the other aberrations are corrected as described below:

In the zoom lens system which comprises the negative lens unit, the positive lens unit and the positive lens unit, the second lens unit produces negative spherical aberration. In order to correct this spherical aberration, an aspherical surface is used in the third lens unit. The negative spherical aberration can be corrected when the aspherical surface used in the third lens unit has a shape which strengthens a negative refractive power as portions of the aspherical surface are farther from the optical axis and produces positive spherical aberration.

Though the negative spherical aberration can be corrected by using an aspherical surface in the second lens unit, this aspherical surface produces negative distortion, thereby aggravating distortion in the zoom lens system as a whole at the wide position. It is possible, by using the aspherical surface in the third lens unit as described above, to correct both the spherical aberration and the distortion in the zoom lens system as a whole.

Though the aperture stop may be moved independently of the lens units for varying focal length from the wide position to the tele position, it is unnecessary to use an additional cam and it is possible to simplify a structure of a lens barrel when the aperture stop is moved integrally with the second lens unit or the third lens unit.

The zoom lens system according to the present invention comprises, in order from the object side, the first negative lens unit, the second positive lens unit and the third positive lens unit, and is configured so as to perform variation of focal length from the wide position to the tele position by moving the first lens unit non-linearly for maintaining the image surface at a constant location, and moving the second lens unit and the third lens unit separately from each other from the image side toward the object side so as to narrow the airspace reserved between these two lens units as already described above. For the zoom lens system according to the present invention, it is desirable to distribute refractive powers among the lens units so as to satisfy the following conditions (1) through (3):

$$0.4 < |f_1/f_T| < 0.7 \quad (1)$$

$$0.5 < f_2/f_3 < 1.0 \quad (2)$$

$$0.7 < f_3/f_T < 1.2 \quad (3)$$

wherein the reference symbols $f_1$, $f_2$ and $f_3$ represent focal lengths of the first lens unit, the second lens unit and the third lens unit respectively, and the reference symbol $f_T$ designates a focal length of the zoom lens system as a whole at the tele position.

The condition (1) defines the focal length of the first lens unit. If the upper limit of the condition (1) is exceeded, the first lens unit will have too weak a refractive power, whereby the zoom lens system will have long total lengths at the wide position and the tele position respectively. Further, when the zoom lens system is focused by moving the first lens unit forward, a distance for moving the first lens unit will be prolonged, the zoom lens system will have a long total length when it is focused on an object located at a short distance, and the first lens unit must have an enlarged outside diameter. If the lower limit of the condition (1) is exceeded, in contrast, an advantage will be obtained for making the zoom lens system compact, but the first lens unit will produce remarkable distortion and astigmatism which can hardly be corrected by the second lens unit and the third lens unit. Further, for correcting the distortion and astigmatism, it will undesirably be necessary to compose the first lens unit of four or more lens elements.

The condition (2) is required for correcting spherical aberration and distortion with good balance by the second lens unit and the third lens unit. If the upper limit of the condition (2) is exceeded, the refractive power of the third lens unit will be strong as compared with that of the second lens unit, thereby making it difficult to correct spherical aberration and distortion which are produced by the positive lens element disposed in the third lens unit. If the lower limit of the condition (2) is exceeded, in contrast, the second lens unit will have too strong a refractive power, thereby making it difficult to correct spherical aberration and distortion which are produced by the second lens unit. The dissatisfaction of the condition (2) will bring about an undesirable result that aberrations cannot be corrected favorably without increasing the number of the lens elements to be disposed in the second lens unit and that of the lens elements to be disposed in the third lens unit, or that the zoom lens system requires a higher manufacturing cost.

When only the second condition (2) is satisfied, however, the refractive powers of both the second lens unit and the third lens unit are weak and the zoom lens system has a prolonged total length or the refractive powers of both the lens units are strong and optical performance of the zoom lens system is degraded. In order to improve the optical performance of the zoom lens system, it will undesirably be obliged to increase the numbers of the lens elements to be disposed in the lens units.

If the upper limit of the condition (3) is exceeded, the third lens unit will have too weak a refractive power and, when the condition (2) is satisfied, the second lens unit will also have too weak a refractive power. In order to obtain a high vari-focal ratio in such a case, it will be required to move the second lens unit and the third lens unit for prolonged distances respectively, whereby the zoom lens system will have a prolonged total length. If the lower limit of the condition (3) is exceeded, the third lens unit will have a strengthened refractive power, whereby the second lens unit will also have a strengthened refractive power. The strengthened refractive powers of the third lens unit and the second lens unit are advantageous for shortening the total length of the zoom lens system, but make it difficult to correct the aberrations which are produced by the second lens unit and the third lens unit. For correcting these aberrations, it is necessary to increase the number of lens elements to be disposed in the lens units while undesirably increasing the manufacturing cost of the zoom lens system.

For obtaining the zoom lens system according to the present invention, it is sufficient to distribute refractive powers among the first lens unit, the second lens unit and the third lens unit so as to satisfy the conditions (1) through (3) mentioned above and compose each of the lens units as already described above. Further, it is desirable for correcting distortion and the other aberrations to dispose the aspherical surface in the third lens unit.

Since the zoom lens system according to the present invention is to be used mainly in single-lens reflex cameras, the lens system must have a certain long back focal length. However, too long a back focal length is undesirable since such a back focal length prolongs the total length of the zoom lens system. For this reason, it is desirable to satisfy the following condition (4):

$$-0.5 < \beta_{3T} < 0.2 \quad (4)$$

wherein the reference symbol $\beta_{3T}$ represents a lateral magnification of the third lens unit at the tele position of the zoom lens system.

If the upper limit of the condition (4) is exceeded on a premise that the condition (3) is satisfied, it will be difficult to obtain a long back focal length at the wide position of the zoom lens system, thereby making it impossible to obtain a high vari-focal ratio. If the lower limit of the condition (4) is exceeded, in contrast, the zoom lens system will have a back focal length longer than required and a long total length.

BRIEF DESCRIPTION OF THE DRAWINGS

FIG. 1a through FIG. 4b show sectional views illustrating compositions of first through fourth embodiments of the zoom lens system according to the present invention;

DETAILED DESCRIPTION OF THE PREFERRED EMBODIMENTS

Figure 2A:
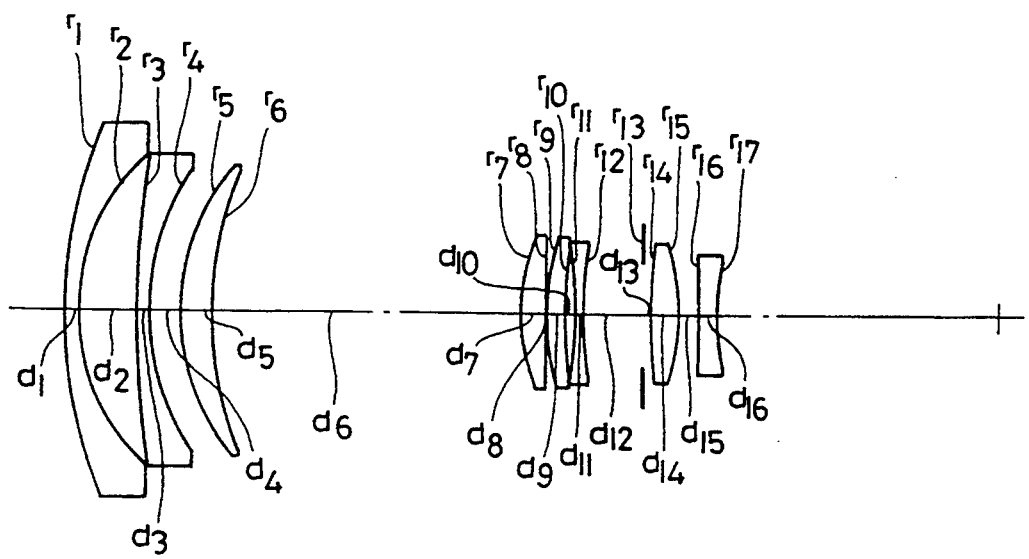
Figure 2B:
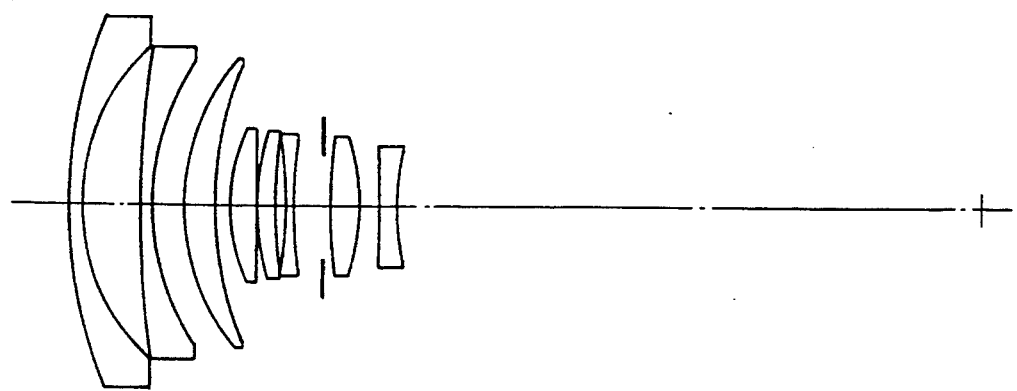
Figure 3A:
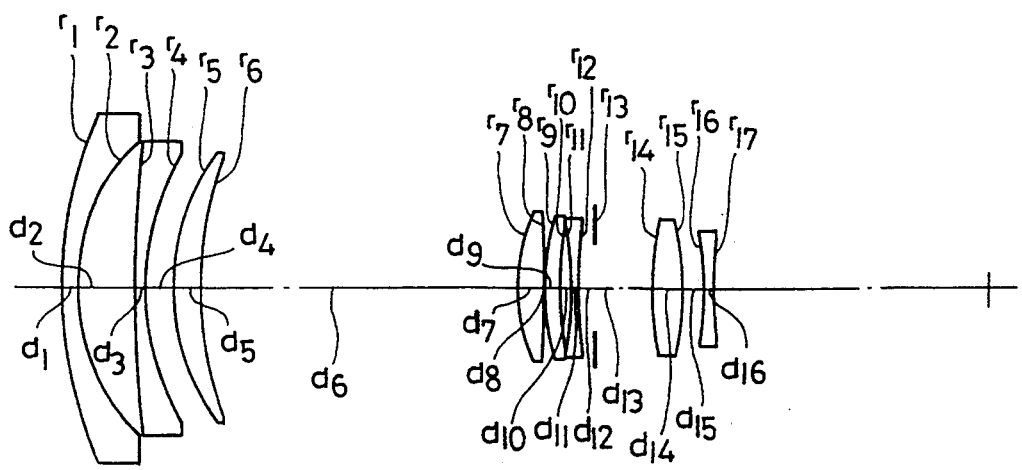
Figure 3B:
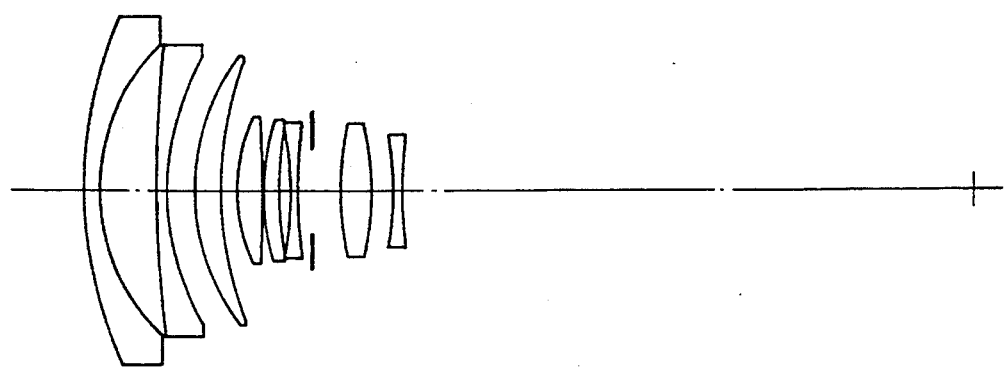
Figure 4A:
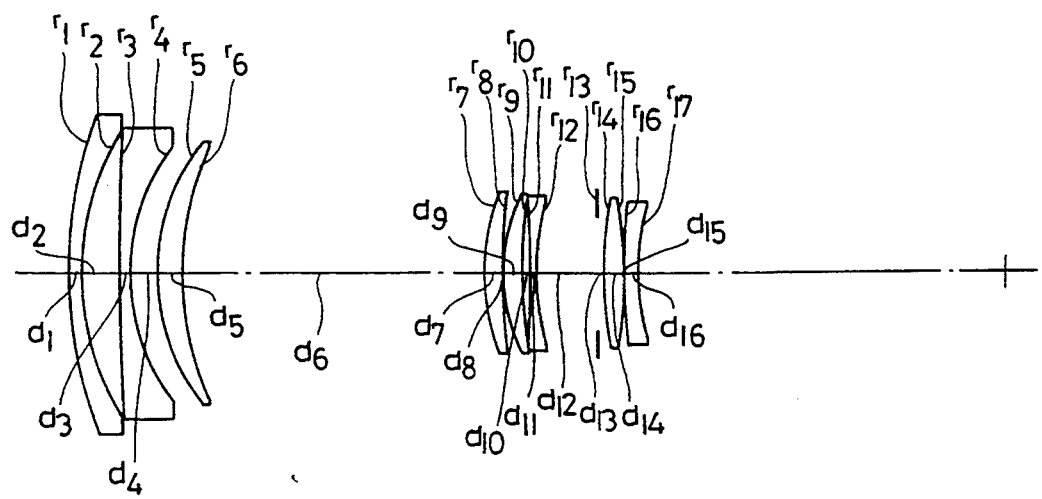
Figure 4B:
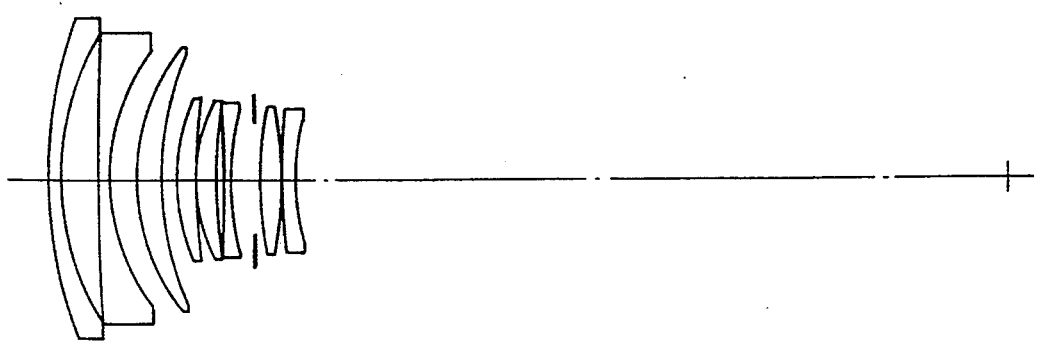
Figure 5A:
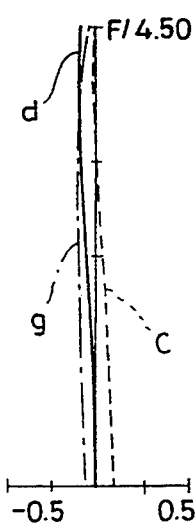
FIGS. 5a–5d show graphs illustrating aberration characteristics at the wide position of the first embodiment of the present invention.
Figure 5B:
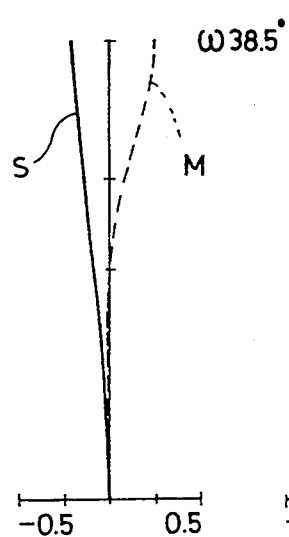
Figure 5C:
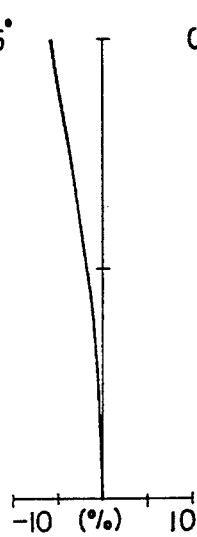
Figure 5D:
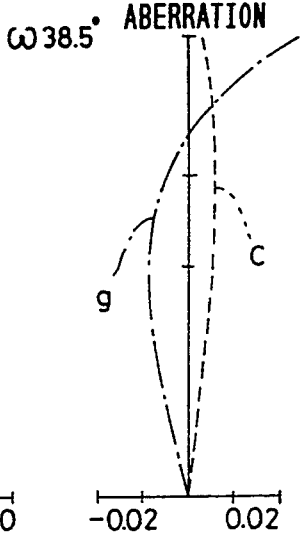
Figure 6A:
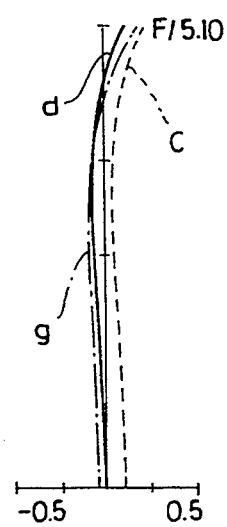
FIGS. 6a–6d show graphs illustrating aberration characteristics at an intermediate focal length of the first embodiment of the present invention.
Figure 6B:
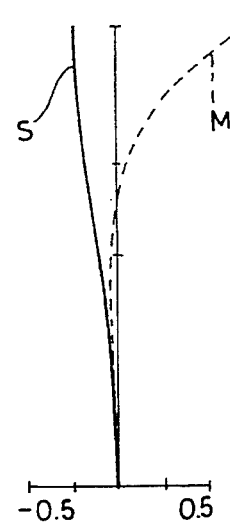
Figure 6C:
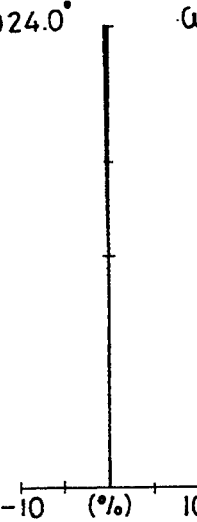
Figure 6D:
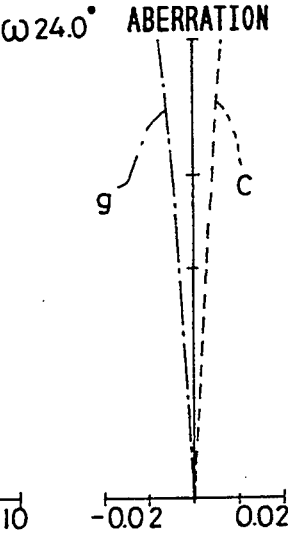
Figure 7A:
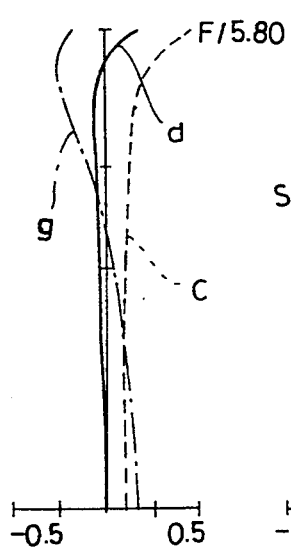
FIGS. 7a–7d show graphs illustrating aberration characteristics at the tele position of the first embodiment of the present invention.
Figure 7B:
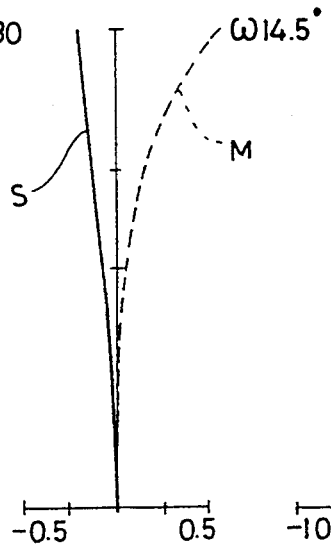
Figure 7C:
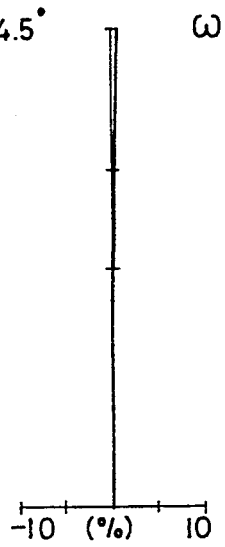
Figure 7D:
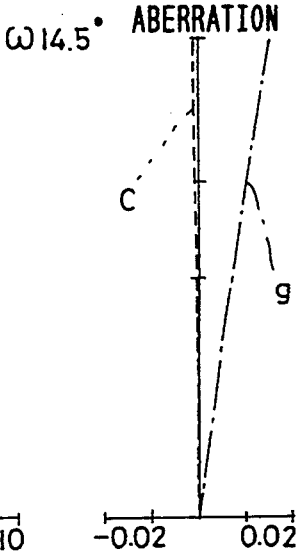
Figure 8A:
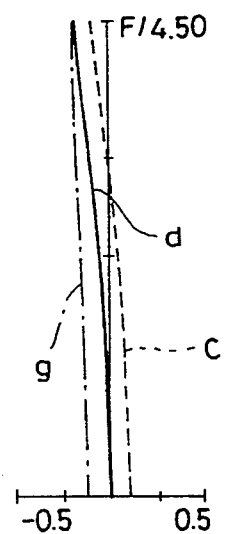
FIGS. 8a–8d show curved illustrating aberration characteristics at the wide position of the second embodiment of the present invention.
Figure 8B:
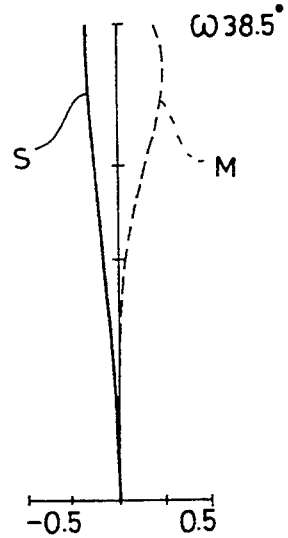
Figure 8C:
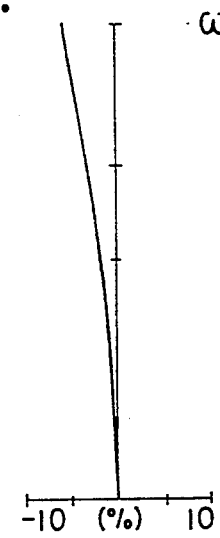
Figure 8D:
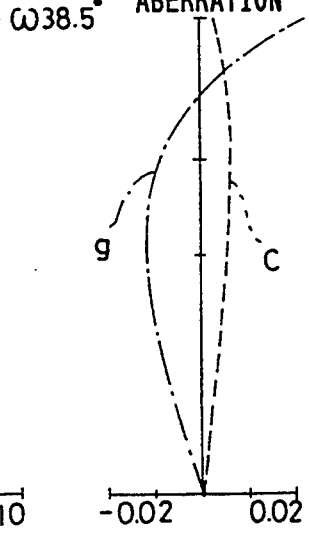
Figure 9A:
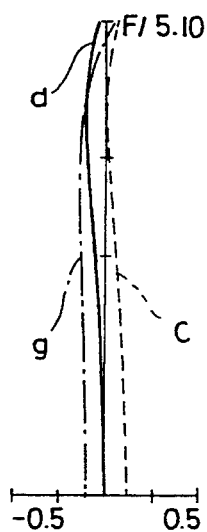
FIGS. 9l–9d show curves illustrating aberration characteristics at the intermediate focal length of the second embodiment of the present invention.
Figure 9B:
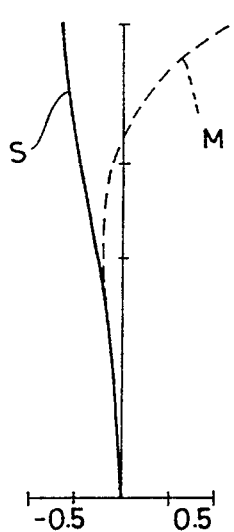
Figure 9C:
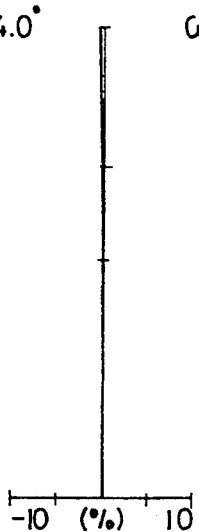
Figure 9D:
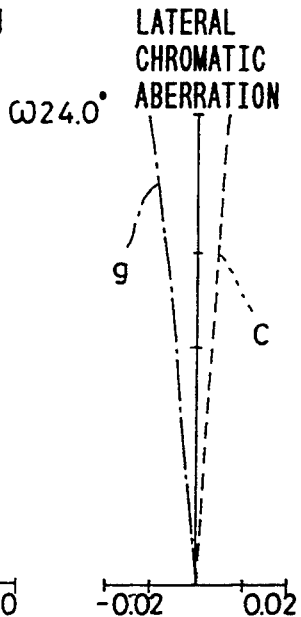
Figure 10A:
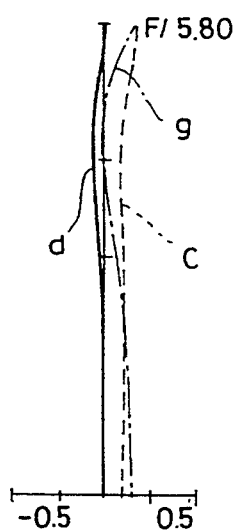
FIGS. 10a–10d show curves illustrating aberration characteristics at the tele position of the second embodiment of the present invention.
Figure 10B:
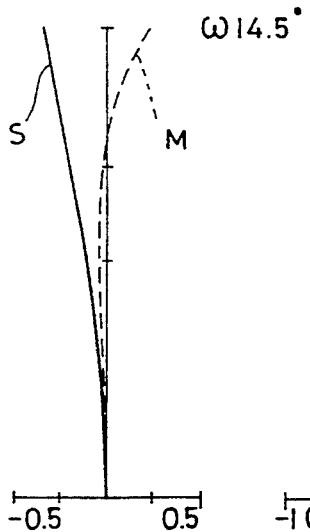
Figure 10C:
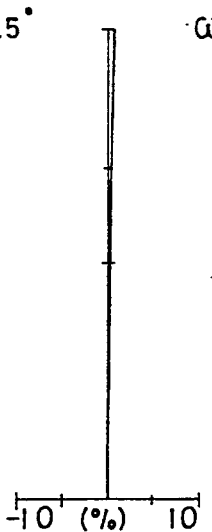
Figure 10D:
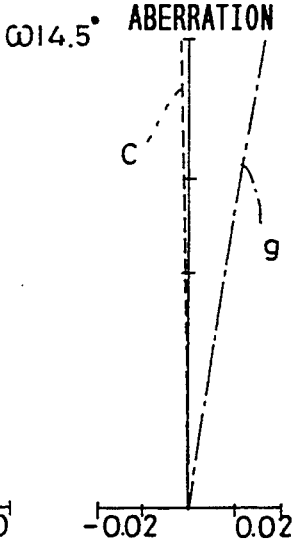
Figure 11A:
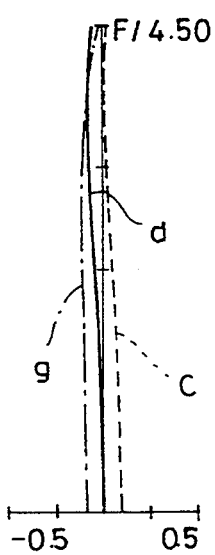
FIGS. 11a–11d show graphs illustrating aberration characteristics at the wide position of the third embodiment of the present invention.
Figure 11B:
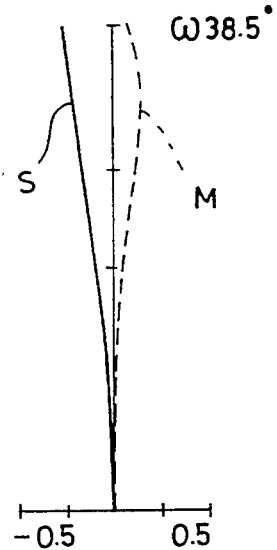
Figure 11C:
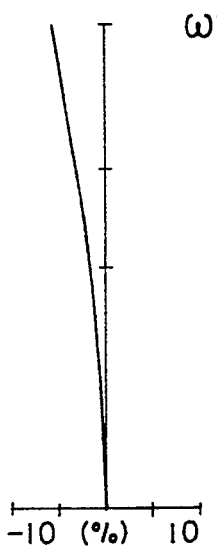
Figure 11D:
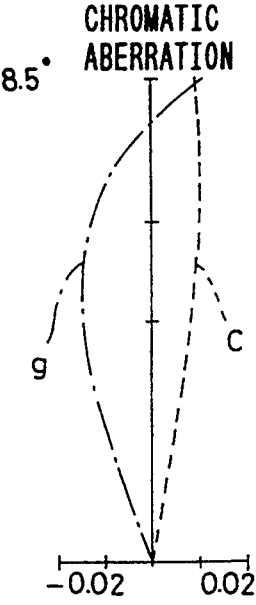
Figure 12A:
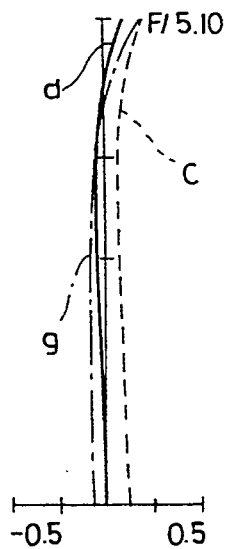
FIGS. 12a–12d show graphs illustrating aberration characteristics at the intermediate focal length of the third embodiment of the present invention.
Figure 12B:
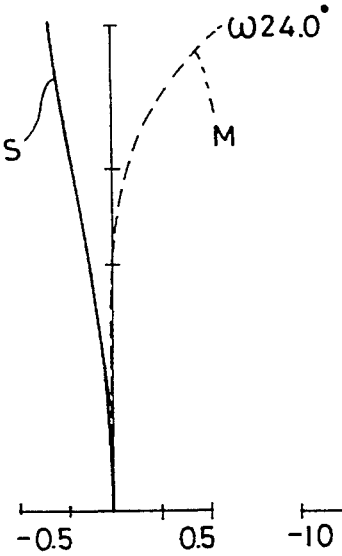
Figure 12C:
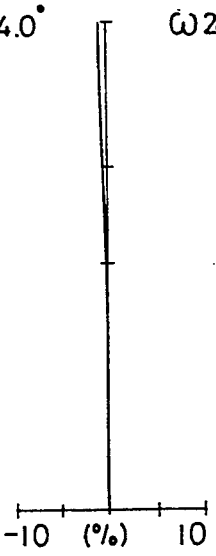
Figure 12D:
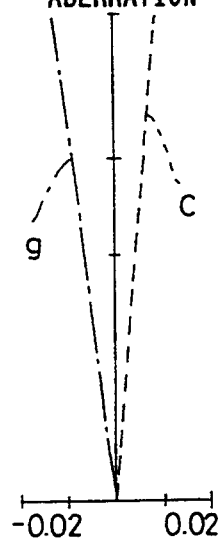
Figure 13A:
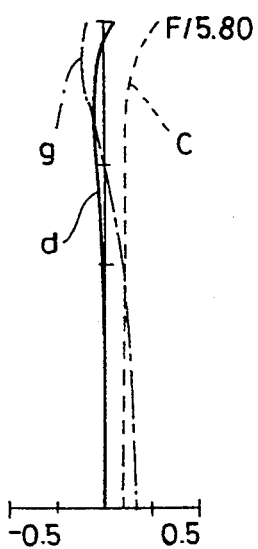
FIGS. 13a–13d show graphs illustrating aberration characteristics at the tele position of the third embodiment of the present invention.
Figure 13B:
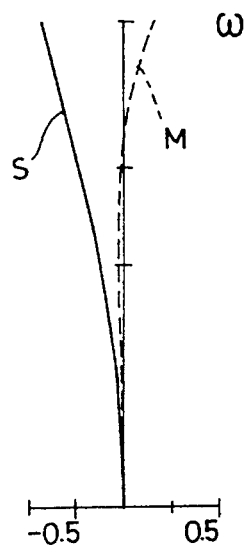
Figure 13C:
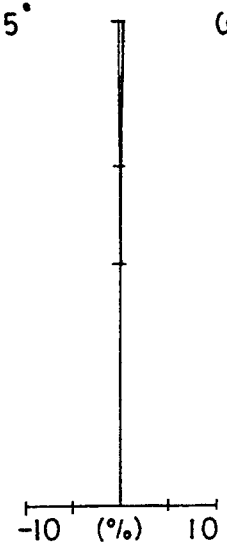
Figure 13D:
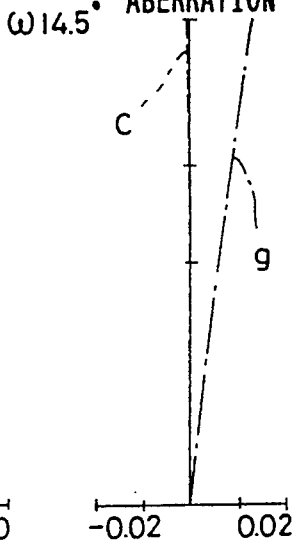
Figure 14A:
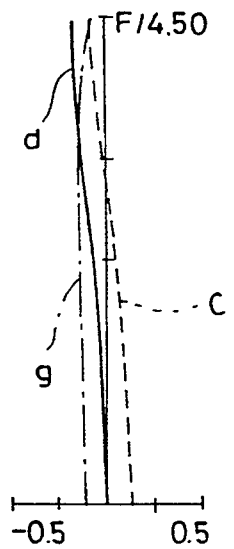
FIGS. 14a–14d show curves illustrating aberration characteristics at the wide position of the fourth embodiment of the present invention.
Figure 14B:
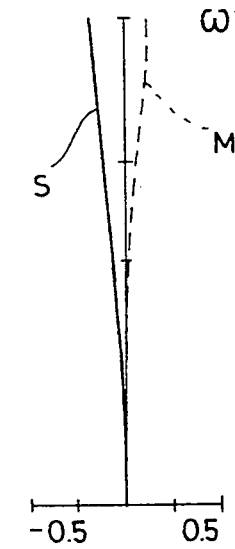
Figure 14C:
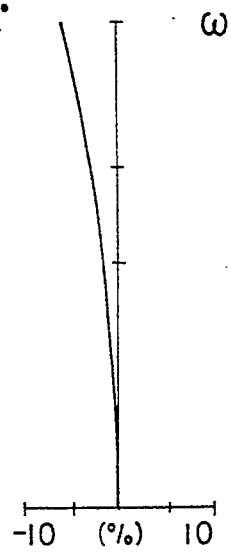
Figure 14D:
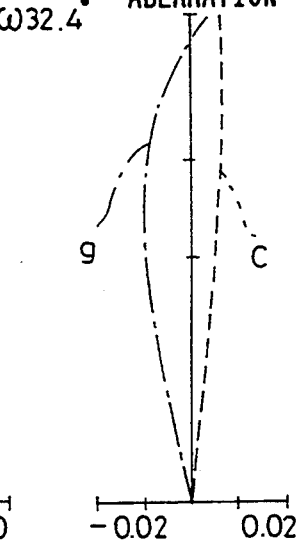
Figure 15A:
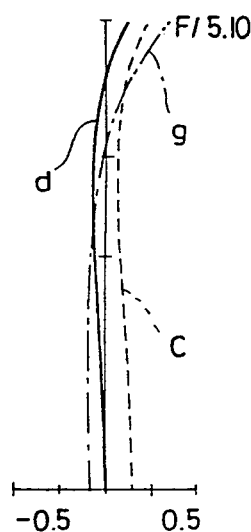
FIGS. 15a–15d show curves illustrating aberration characteristics at the intermediate focal length of the fourth embodiment of the present invention.
Figure 15B:
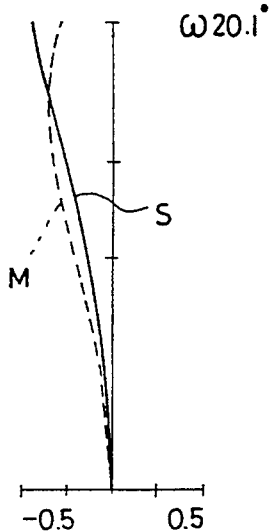
Figure 15C:
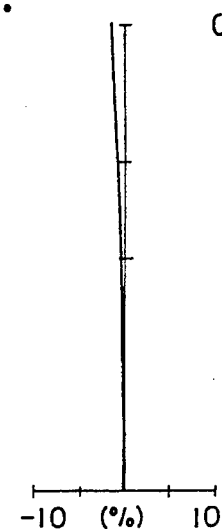
Figure 15D:
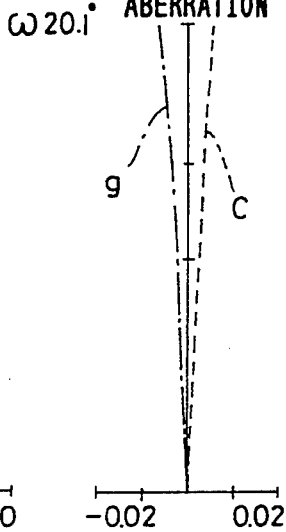
Figure 16A:
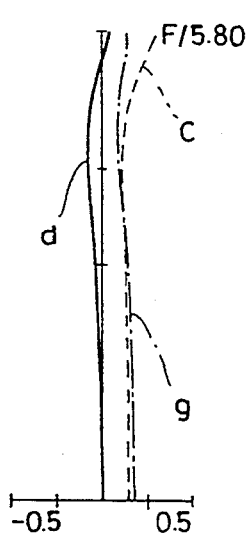
FIGS. 16a–16d show curves illustrating aberration characteristics at the tele position of the fourth embodiment of the present invention.
Figure 16B:
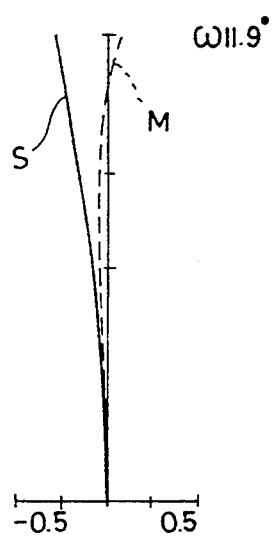
Figure 16C:
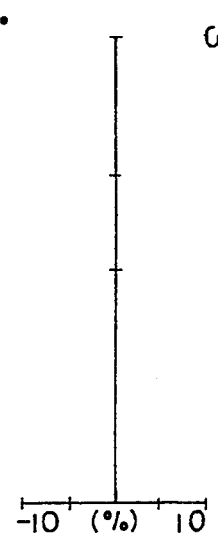
Figure 16D:
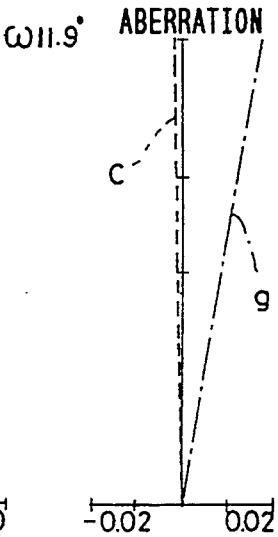

Now, the present invention will be described in more detail below with reference to the preferred embodiments illustrated in the accompanying drawings and given in the form of the following numerical data:

Embodiment 1
$f = 28.82 \sim 48.8 \sim 82.8$ mm, F/4.5 $\sim$ 5.1 $\sim$ 5.8

| | | | |
|---|---|---|---|
| $r_1 = 59.667$ | | | |
| | $d_1 = 2.07$ | $n_1 = 1.72916$ | $\nu_1 = 54.68$ |
| $r_2 = 27.088$ | | | |
| | $d_2 = 8.05$ | | |
| $r_3 = 148.822$ | | | |
| | $d_3 = 1.55$ | $n_2 = 1.73400$ | $\nu_2 = 51.49$ |
| $r_4 = 32.842$ | | | |
| | $d_4 = 4.56$ | | |
| $r_5 = 30.120$ | | | |
| | $d_5 = 4.14$ | $n_3 = 1.78472$ | $\nu_3 = 25.71$ |
| $r_6 = 49.266$ | | | |
| | $d_6 = D_1$ | | |
| $r_7 = 22.035$ | | | |
| | $d_7 = 3.83$ | $n_4 = 1.57250$ | $\nu_4 = 57.76$ |
| $r_8 = -2974.406$ | | | |
| | $d_8 = 0.10$ | | |
| $r_9 = 35.604$ | | | |
| | $d_9 = 2.21$ | $n_5 = 1.63854$ | $\nu_5 = 55.38$ |
| $r_{10} = 97.166$ | | | |
| | $d_{10} = 1.24$ | | |
| $r_{11} = -61.647$ | | | |
| | $d_{11} = 1.00$ | $n_6 = 1.78472$ | $\nu_6 = 25.71$ |
| $r_{12} = 60.047$ | | | |
| | $d_{12} = D_2$ | | |
| $r_{13} = $ (stop) | | | |
| | $d_{13} = 1.00$ | | |
| $r_{14} = 32.774$ | | | |
| | $d_{14} = 4.77$ | $n_7 = 1.65844$ | $\nu_7 = 50.86$ |
| $r_{15} = -42.286$ | | | |
| | $d_{15} = 2.87$ | | |
| $r_{16} = -98.504$ (aspherical surface) | | | |
| | $d_{16} = 2.48$ | $n_8 = 1.75700$ | $\nu_8 = 47.87$ |
| $r_{17} = 38.557$ | | | |

| aspherical surface coefficients | | |
|---|---|---|
| $E = -3.7466 \times 10^{-5}$, | $F = -8.2306 \times 10^{-8}$, | |
| $G = 5.0944 \times 10^{-10}$, | $H = -5.1942 \times 10^{-12}$ | |

| f | 28.82 | 48.80 | 82.80 |
|---|---|---|---|
| $D_1$ | 42.52 | 16.83 | 2.00 |
| $D_2$ | 7.74 | 5.85 | 3.90 |
| $f_B$ | 38.87 | 54.72 | 80.84 |

| $|f_1/f_T| = 0.58$, | $f_2/f_3 = 0.79$, | $f_3/f_T = 0.96$, |
|---|---|---|
| $\beta_{3T} = -0.21$ | | |

Embodiment 2
$f = 28.82 \sim 48.8 \sim 82.8$ mm, F/4.5 $\sim$ 5.1 $\sim$ 5.8

| | | | |
|---|---|---|---|
| $r_1 = 58.933$ | | | |
| | $d_1 = 2.07$ | $n_1 = 1.72916$ | $\nu_1 = 54.68$ |
| $r_2 = 27.525$ | | | |
| | $d_2 = 8.01$ | | |
| $r_3 = 130.919$ | | | |
| | $d_3 = 1.55$ | $n_2 = 1.73400$ | $\nu_2 = 51.49$ |
| $r_4 = 32.243$ | | | |
| | $d_4 = 4.51$ | | |
| $r_5 = 29.514$ | | | |
| | $d_5 = 4.10$ | $n_3 = 1.78472$ | $\nu_3 = 25.71$ |
| $r_6 = 45.717$ | | | |
| | $d_6 = D_1$ | | |
| $r_7 = 21.308$ | | | |
| | $d_7 = 3.89$ | $n_4 = 1.57250$ | $\nu_4 = 57.76$ |
| $r_8 = -1115.393$ | | | |

-continued $r_9 = 35.685$
$d_8 = 0.10$ $d_9 = 2.54$   $n_5 = 1.63854$   $\nu_5 = 55.38$ $r_{10} = 76.983$
$d_{10} = 1.33$ $r_{11} = -59.182$
$d_{11} = 1.20$   $n_6 = 1.78472$   $\nu_6 = 25.71$ $r_{12} = 63.500$
$d_{12} = D_2$ $r_{13} = $ (stop)
$d_{13} = 1.00$ $r_{14} = 46.437$
(aspherical surface)
$d_{14} = 4.14$   $n_7 = 1.65844$   $\nu_7 = 50.86$ $r_{15} = -28.665$
$d_{15} = 2.65$ $r_{16} = -235.059$
$d_{16} = 2.47$   $n_8 = 1.75700$   $\nu_8 = 47.87$ $r_{17} = 30.192$

| aspherical surface coefficients | |
|---|---|
| $E = -3.6206 \times 10^{-5}$, | $F = -3.4581 \times 10^{-8}$, |
| $G = -1.0641 \times 10^{-10}$, | $H = 1.0068 \times 10^{-12}$ |

| f | 28.82 | 48.80 | 82.80 |
|---|---|---|---|
| $D_1$ | 42.55 | 16.81 | 2.00 |
| $D_2$ | 7.94 | 5.95 | 3.94 |
| $f_B$ | 38.89 | 54.73 | 80.76 |

$|f_1/f_T| = 0.58$,   $f_2/f_3 = 0.80$,   $f_3/f_T = 0.93$,
$\beta_{3T} = -0.22$ Embodiment 3
$f = 28.82 \sim 48.8 \sim 82.8$ mm,   F/4.5 $\sim$ 5.1 $\sim$ 5.8

$r_1 = 58.128$
$d_1 = 2.07$   $n_1 = 1.72916$   $\nu_1 = 54.68$ $r_2 = 26.925$
$d_2 = 7.95$ $r_3 = 170.728$
$d_3 = 1.60$   $n_2 = 1.73400$   $\nu_2 = 51.49$ $r_4 = 35.330$
$d_4 = 3.95$ $r_5 = 30.091$
$d_5 = 3.83$   $n_3 = 1.78472$   $\nu_3 = 25.71$ $r_6 = 48.099$
$d_6 = D_1$ $r_7 = 21.734$
$d_7 = 3.81$   $n_4 = 1.57250$   $\nu_4 = 57.76$ $r_8 = -346.256$
$d_8 = 0.13$ $r_9 = 33.120$
$d_9 = 2.28$   $n_5 = 1.63854$   $\nu_5 = 55.38$ $r_{10} = 62.532$
$d_{10} = 1.46$ $r_{11} = -55.771$
$d_{11} = 1.00$   $n_6 = 1.78472$   $\nu_6 = 25.71$ $r_{12} = 67.074$
$d_{12} = 2.76$ $r_{13} = $ (stop)
$d_{13} = D_2$ $r_{14} = 36.192$
$d_{14} = 4.54$   $n_7 = 1.65844$   $\nu_7 = 50.86$ $r_{15} = -37.405$
$d_{15} = 2.92$ $r_{16} = -50.215$
(aspherical surface)
$d_{16} = 1.38$   $n_8 = 1.75700$   $\nu_8 = 47.87$ $r_{17} = 66.890$

| aspherical surface coefficients | |
|---|---|
| $E = -3.4698 \times 10^{-5}$, | $F = -5.7590 \times 10^{-8}$, |
| $G = 2.1514 \times 10^{-10}$, | $H = -3.0408 \times 10^{-12}$ |

| f | 28.82 | 48.80 | 82.80 |
|---|---|---|---|
| $D_1$ | 44.55 | 17.54 | 2.00 |
| $D_2$ | 7.42 | 5.36 | 3.23 |
| $f_B$ | 38.94 | 54.76 | 80.70 |

$|f_1/f_T| = 0.59$,   $f_2/f_3 = 0.79$,   $f_3/f_T = 0.95$,
$\beta_{3T} = -0.20$ Embodiment 4
$f = 36.2 \sim 60.0 \sim 102.6$ mm,   F/4.5 $\sim$ 5.1 $\sim$ 5.8

$r_1 = 59.248$
$d_1 = 2.00$   $n_1 = 1.74320$   $\nu_1 = 49.31$ $r_2 = 38.191$
$d_2 = 5.32$ $r_3 = 297.036$
$d_3 = 1.80$   $n_2 = 1.71300$   $\nu_2 = 53.84$ $r_4 = 29.663$
$d_4 = 3.88$ $r_5 = 29.451$
$d_5 = 3.71$   $n_3 = 1.80518$   $\nu_3 = 25.43$ $r_6 = 44.697$
$d_6 = D_1$ $r_7 = 27.600$
$d_7 = 2.77$   $n_4 = 1.69680$   $\nu_4 = 55.52$ $r_8 = 81.374$
$d_8 = 0.10$ $r_9 = 25.330$
$d_9 = 2.92$   $n_5 = 1.65830$   $\nu_5 = 57.33$ $r_{10} = 77.593$
$d_{10} = 0.98$ $r_{11} = -250.083$
$d_{11} = 1.00$   $n_6 = 1.76182$   $\nu_6 = 26.55$ $r_{12} = 40.015$
$d_{12} = D_2$ $r_{13} = $ (stop)
$d_{13} = 1.00$ $r_{14} = 55.054$
$d_{14} = 3.01$   $n_7 = 1.69350$   $\nu_7 = 53.23$ $r_{15} = -63.780$
$d_{15} = 0.10$ $r_{16} = 143.141$
$d_{16} = 1.93$   $n_8 = 1.62012$   $\nu_8 = 49.66$ $r_{17} = 34.384$
(aspherical surface)

| aspherical surface coefficients | |
|---|---|
| $E = 2.2929 \times 10^{-5}$, | $F = 5.8241 \times 10^{-8}$, |
| $G = 1.0216 \times 10^{-10}$, | $H = 1.6065 \times 10^{-12}$ |

| f | 36.2 | 60.0 | 102.6 |
|---|---|---|---|
| $D_1$ | 43.72 | 17.82 | 2.00 |
| $D_2$ | 8.70 | 5.88 | 3.30 |
| $f_B$ | 53.02 | 71.76 | 103.74 |

$|f_1/f_T| = 0.54$,   $f_2/f_3 = 0.65$,   $f_3/f_T = 0.93$,
$\beta_{3T} = -0.14$ wherein the reference symbols $r_1, r_2, \ldots$ represent radii of curvature on the surface of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

The first through the third embodiments have field angles of 77° to 29°, whereas the fourth embodiment has field angles of 65° to 24°. Each of these embodiments has a vari-focal ratio of approximately 3. An aperture stop is moved integrally with the third lens unit in each of the embodiments 1, 2 and 4, whereas an aperture stop is moved integrally with the second lens unit in the third embodiment.

The aspherical surfaces used in these embodiments have shapes which are expressed by the following formula:

$$x = \frac{cy^2}{1 + \sqrt{1 - c^2 y^2}} + Ey^4 + Fy^6 + Gy^8 + Hy^{10}$$

wherein the reference symbol C represents a curvature ($1/r$) as measured at a vertex of an aspherical surface, and the reference symbols E, F, G and H designate aspherical surface coefficients.

Though the aspherical surface is used only in the third lens unit in each of the first through the fourth embodiment, a zoom lens system having higher optical performance can be obtained by using additional aspherical surfaces in the first lens unit and/or the second lens unit.

As is understood from the foregoing description, the zoom lens system according to the present invention, wherein the first lens unit which inevitably has a large diameter is composed only of three lens elements, comprises a small number of lens elements, and has a compact size, a vari-focal ratio of approximately 3 and favorable optical performance.

I claim:

1. A zoom lens system comprising, in order from the object side:
   a first negative lens unit,
   a second positive lens unit, and
   a third positive lens unit;
   a focal length of said zoom lens system being varied from a wide position to a tele position by moving said first lens unit non-linearly so as to maintain an image surface at a constant location, and moving said second lens unit and said third lens unit independently of each other from the image side toward the object side so as to narrow an airspace reserved between said second lens unit and said third lens unit; and
   wherein said first lens unit consists of:
      a negative meniscus lens element having a convex surface on the object side,
      a negative lens element, and
      a positive lens element having a convex surface on the object side.

2. A zoom lens system according to claim 1, wherein said second lens unit includes, in order from the object side, at least two positive lens elements and a biconcave lens element.

3. A zoom lens system comprising, in order from the object side:
   a first negative lens unit,
   a second positive lens unit, and
   a third positive lens unit;
   wherein a focal length of said zoom lens system is varied from a wide position to a tele position by moving said first lens unit non-linearly so as to maintain an image surface at a constant location and moving said second lens unit and said third lens unit independently of each other from the image side toward the object side so as to narrow an airspace reserved therebetween, and
   wherein said first lens unit consists of a negative meniscus lens element having a convex surface on the object side a negative lens element and a positive lens element having a convex surface on the object side,
   wherein said third lens unit consists, in order from the object side, of a positive lens element and a negative lens element.

4. A zoom lens system comprising, in order from the object side:
   a first negative lens unit,
   a second positive lens unit, and
   a third positive lens unit;
   wherein a focal length of said zoom lens system is varied from a wide position to a tele position by moving said first lens unit non-linearly so as to maintain an image surface at a constant location and moving said second lens unit and said third lens unit independently of each other from the image side toward the object side so as to narrow an airspace reserved therebetween, and
   wherein said first lens unit consists of a negative meniscus lens element having a convex surface on the object side a negative lens element and a positive lens element having a convex surface on the object side,
   wherein said third lens unit comprises an aspherical surface having a shape which strengthens a negative refractive power as portions of said aspherical surface are farther from an optical axis.

5. A zoom lens system comprising in order from the object side:
   a first negative lens unit,
   a second positive lens unit, and
   a third positive lens unit;
   wherein a focal length of said zoom lens system is varied from a wide position to a tele position by moving said first lens unit non-linearly so as to maintain an image surface at a constant location and moving said second lens unit and said third lens unit independently of each other from the image side toward the object side so as to narrow an airspace reserved therebetween, and
   wherein said first lens unit consists of a negative meniscus lens element having a convex surface on the object side a negative lens element and a positive lens element having a convex surface on the object side,
   satisfying the following conditions (1) through (3):

$$0.4 < |f_1/f_t| < 0.7 \quad (1)$$

$$0.5 < f_2/f_3 < 1.0 \quad (2)$$

$$0.7 < f_3/f_T < 1.2 \quad (3)$$

wherein the reference symbols $f_1$, $f_2$ and $f_3$ represent focal lengths of the first lens unit, the second lens unit and the third lens unit respectively, and the reference symbol $f_T$ designates a focal length of the zoom lens system as a whole at the tele position.

6. A zoom lens system according to claim 5 satisfying the following condition (4):

$$-0.5 < \beta_{3T} < 0.2 \quad (4)$$

wherein the reference symbol $\beta_{3T}$ represents a lateral magnification of the third lens unit at the tele position of the zoom lens system.

* * * * *

UNITED STATES PATENT AND TRADEMARK OFFICE
CERTIFICATE OF CORRECTION

PATENT NO.    :    5,434,710

DATED         :    July 18, 1995

INVENTOR(S)   :    NOZAWA, Toshihide

It is certified that error appears in the above-identified patent and that said Letters Patent is hereby corrected as shown below:

[75] The Inventor should read:    Toshihide NOZAWA

Signed and Sealed this

Third Day of October, 1995

Attest:

BRUCE LEHMAN

*Attesting Officer*    Commissioner of Patents and Trademarks